US012249699B2

(12) United States Patent
Lee (10) Patent No.: US 12,249,699 B2
(45) Date of Patent: Mar. 11, 2025

(54) COOLING MEMBER FOR BATTERY MODULE AND BATTERY MODULE INCLUDING SAME (71) Applicant: AMOGREENTECH CO., LTD., Gimpo-si (KR)

(72) Inventor: Hwan Ku Lee, Gimpo-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 488 days.

(21) Appl. No.: 17/636,840

(22) PCT Filed: Aug. 19, 2020

(86) PCT No.: PCT/KR2020/011058
§ 371 (c)(1),
(2) Date: Feb. 18, 2022

(87) PCT Pub. No.: WO2021/034108
PCT Pub. Date: Feb. 25, 2021

(65) Prior Publication Data
US 2022/0302522 A1 Sep. 22, 2022

(30) Foreign Application Priority Data
Aug. 19, 2019 (KR) .................. 10-2019-0100850

(51) Int. Cl.
*H01M 10/6555* (2014.01)
*B60L 58/26* (2019.01)
(Continued)

(52) U.S. Cl.
CPC ......... *H01M 10/6555* (2015.04); *B60L 58/26* (2019.02); *H01M 10/613* (2015.04);
(Continued)

(58) Field of Classification Search
None
See application file for complete search history.

(56) References Cited

U.S. PATENT DOCUMENTS

2010/0104938 A1* 4/2010 Hermann ............ H01M 10/653
429/120
2012/0050994 A1* 3/2012 Boday .................. C08F 126/06
361/702

FOREIGN PATENT DOCUMENTS

| CN | 109153868 A | 1/2019 |
| CN | 109563361 A | 4/2019 |

(Continued)

OTHER PUBLICATIONS

Office Action for CN 202080059047.9 by China National Intellectual Property Administration dated Jul. 29, 2023.
International Search Report dated on Dec. 1, 2020.

*Primary Examiner* — Alix E Eggerding
(74) *Attorney, Agent, or Firm* — BROADVIEW IP LAW, PC (57) ABSTRACT Provided is a cooling member for a battery module. The cooling member for a battery module according to one embodiment of the present invention is a cooling member for a battery module having a cooling plate that contacts a plurality of battery cells to transfer heat emitted from the battery cells to the outside. The cooling member is implemented by including a predetermined pattern to accommodate at least a part of the outer surface of the battery cells on a main surface along the longitudinal direction thereof, and an insulating heat dissipation layer which covers a part or all of the outer surface of the cooling plate so as to be interposed between the battery cells to be accommodated on the predetermined pattern and the cooling plate.

8 Claims, 6 Drawing Sheets (51) Int. Cl.
*H01M 10/613* (2014.01)
*H01M 10/625* (2014.01)
*H01M 10/643* (2014.01)
*H01M 10/653* (2014.01)

(52) U.S. Cl.
CPC ....... *H01M 10/625* (2015.04); *H01M 10/643* (2015.04); *H01M 10/653* (2015.04); *H01M 2220/20* (2013.01)

(56) References Cited

FOREIGN PATENT DOCUMENTS

| | | |
|---|---|---|
| CN | 109638374 A | 4/2019 |
| DE | 102015118605 A1 | 7/2017 |
| JP | 2019-075256 A | 5/2019 |
| KR | 10-2006-0034130 A | 4/2006 |
| KR | 1020060060808 A | 6/2006 |
| KR | 10-2007-0014658 A | 2/2007 |
| KR | 10-2013-0033597 A | 4/2013 |
| KR | 1020160105356 A | 9/2016 |
| KR | 10-2017-0142624 A | 12/2017 |
| KR | 101818922 B1 | 1/2018 |
| KR | 10-2018-0110382 A | 10/2018 |
| WO | 2016-067517 A1 | 5/2016 |

\* cited by examiner

COOLING MEMBER FOR BATTERY MODULE AND BATTERY MODULE INCLUDING SAME

CROSS-REFERENCE TO RELATED APPLICATION(S)

This application is the U.S. National Stage filing under 35 U.S.C. 371 of International Application No. PCT/KR2020/011058, filed on Aug. 19, 2020, which claims priority to Korean Patent Application No. 10-2019-0100850, filed on Aug. 19, 2019 in Korean Intellectual Property Office, all of which are hereby incorporated by reference in their entirety.

TECHNICAL FIELD

The present invention relates to a cooling member, and more particularly, to a cooling member for a battery module and a battery module comprising the same.

BACKGROUND

The heat dissipation characteristic of a battery module is very important enough to influence the performance of the battery. Heat entry and exit are accompanied during charging and discharging of the battery, and the amount of heat generated at this time is proportional to the capacity of the unit cell, that is, the number of stacked unit cells. However, the heat generated during charging and discharging is released during the rest period, and the thicker the battery, the less the heat generated during discharging tends to be dissipated sufficiently during the resting period. As such, when the generated heat is accumulated in the battery, the temperature inside the battery rises, and as a result, the battery performance is deteriorated, and in severe cases, there is a risk of explosion. In particular, when the battery module is applied to a large-capacity secondary battery for driving a motor for an electric vacuum cleaner, electric scooter, or automobile, particularly as a main energy source for an electric vehicle, since it is charged and discharged with a large current, the temperature of the battery rises to a significant temperature by the heat generated inside the battery.

Meanwhile, electrical separation and flame-retardant characteristics are very important between each unit cell provided in the battery module. If electrical insulation and flame retardancy are not provided between unit cells, there is a risk of a large explosion or fire. In addition, if the flame is unintentionally transferred in a chain to components connected to each of the unit cells but not electrically connected to the unit cells, the fire may spread throughout the device or the device including the battery module, so electrical separation and flame retardancy are also very important between the components in the battery module and the unit cells. Therefore, in the case of components that are not intended to be electrically connected to the unit cells in the battery module, insulation of a certain level or higher is required to prevent electricity from being transmitted to other places even if the unit cells are leaking.

There may be a heat dissipation member for quickly dissipating heat generated from the unit cell to the outside among components that are not intended to be electrically connected to the unit cell in the battery module. As the number or capacity of the unit cells provided in the battery module increases, the amount of heat generated also increases, so the heat dissipation performance of the heat dissipation member is very important. For this reason, a conductive material such as aluminum, which is a material having high thermal conductivity through contact, may be considered as a heat dissipation member. However, while the heat dissipation member made of the conductive material has excellent thermal conductivity, there is a problem in that it is not electrically separated when in contact with the unit cell, that is, it does not have insulation.

Accordingly, in recent years, research has been actively conducted to construct a battery module by interposing an insulating member between a heat-dissipating member made of an unavoidably used conductive material and an insulating battery, but since the insulating member has no heat dissipation performance, there is a problem in that heat generated from the unit cell cannot be transferred to the heat dissipation member. In addition, even when an insulating member and a heat dissipation member are provided together to achieve insulation and heat dissipation at the same time, there is a problem in that heat transfer is not very easy due to the insulating effect due to the air layer existing at the interface between the insulating member and the unit cell, and the insulating member and the heat dissipating member.

Accordingly, there is an urgent need to research a cooling member that can rapidly transfer a large amount of heat generated from a plurality of unit cells to the outside and electrically separate the unit cells even when in contact with the unit cells due to excellent insulation.

The above information disclosed in this Background section is only for enhancement of understanding of the background of the invention and it may therefore contain information that does not form the prior art that is already known to a person of ordinary skill in the art.

SUMMARY

Technical Problem

The present invention has been devised in view of the above points, and is directed to providing a cooling member for a battery module capable of effectively transferring heat generated from a battery, which is a heat source, to the outside to cool the battery with better efficiency, and stably separating the battery electrically by the expression of excellent insulation properties; and a battery module including the same.

In addition, the present invention is directed to providing a cooling member for a battery module implemented such that a process of manufacturing the battery module by assembling the unit cell with the cooling member is very easy, and reworking thereof is also possible.

Technical Solution

An exemplary embodiment of the present invention provides a cooling member for a battery module having a cooling plate in contact with a plurality of battery cells to transfer heat emitted from the battery cells to the outside, the cooling member for a battery module including a predetermined pattern formed to accommodate at least a portion of the outer surface of the battery cell on the main surface along the longitudinal direction, and an insulating heat dissipation layer covering part or all of an outer surface of the cooling plate so as to be interposed between the battery cell to be accommodated on the predetermined pattern and the cooling plate.

According to an embodiment of the present invention, the pattern may be formed by a cooling plate having a corrugated cross-section or an insulating heat dissipation layer having a corrugated cross-section.

In addition, the battery cell may have a cylindrical shape.

In addition, the cooling plate may have at least one moving passage through which a refrigerant flows therein.

In addition, the insulating heat dissipation layer may have a withstand voltage of 5 kV/mm or more.

In addition, the insulating heat dissipation layer may be a coating layer or a pad layer in which an insulating heat dissipation filler is dispersed in a silicon-based matrix.

In addition, the insulating heat dissipation layers may have a thickness of 300 to 5000 μm, more preferably 300 to 1000 μm, and still more preferably 300 to 500 μm. In addition, at this time, the insulating heat dissipation layer may have a Shore OO hardness of 35 to 50.

In addition, the insulating heat dissipation layer is a coating layer and may further include a silicone-based primer layer between the coating layer and the cooling plate, or the insulating heat dissipation layer is a pad layer and may further include a fixing member including an adhesive layer between the pad layer and the cooling plate to fix the pad layer to the cooling plate.

In addition, the cooling member may further include an insulating member provided in close contact with the insulating heat dissipation layer.

In addition, the present invention provides a battery module including the cooling member according to the present invention.

In addition, the present invention provides an electric vehicle including the cooling member according to the present invention.

Advantageous Effects

The cooling member for a battery module according to the present invention effectively can transfer heat generated from the battery, which is a heat source, to the outside to cool a unit battery with better efficiency, and stably separate the battery electrically by the expression of excellent insulation properties, thereby minimizing explosion or fire.

In addition, a process of assembling the unit battery and the cooling member is very easy, and reworking thereof is also possible, such that the efficiency of the assembly process of the battery module can be significantly improved. Due to this, the cooling member for a battery module according to the present invention has great utility in large-capacity electrical components, and can be applied to various industries such as electric vehicles.

BRIEF DESCRIPTION OF THE DRAWINGS

The above and other aspects, features, and advantages of the present invention will become more apparent to those of ordinary skill in the art by describing embodiments thereof in detail with reference to the accompanying drawings, in which.

BEST MODE FOR CARRYING OUT THE INVENTION

Hereinafter, exemplary embodiments of the present invention will be described in detail so that those of ordinary skill in the art can readily implement the present invention with reference to the accompanying drawings. The present invention may be embodied in many different forms and is not limited to the embodiments set forth herein. In the drawings, parts unrelated to the description are omitted for clarity. Throughout the specification, like reference numerals denote like elements.

Figure 1:
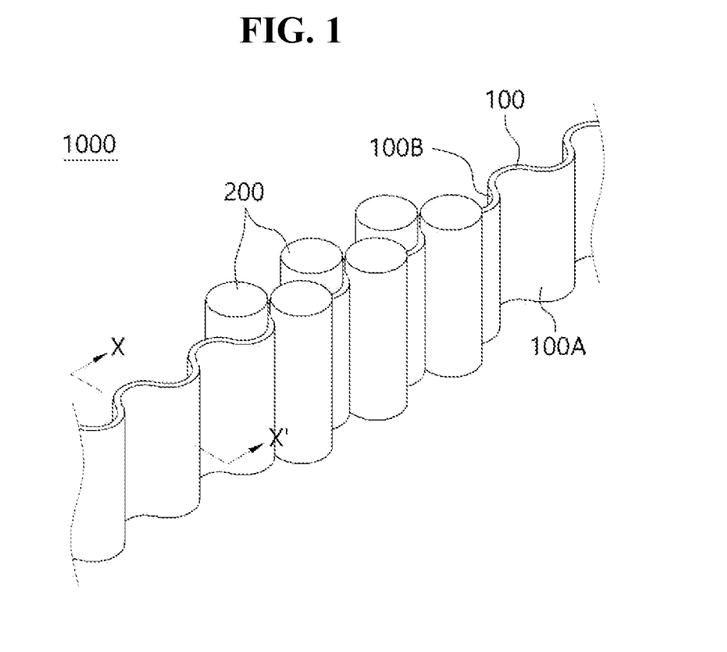
FIG. 1 is a perspective view of a battery module according to an exemplary embodiment of the present invention.
Figure 2:
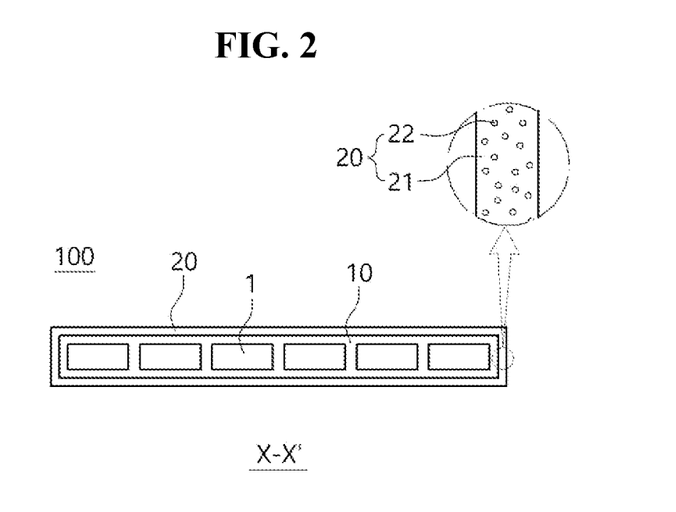
FIG. 2 is a cross-sectional mimetic diagram of a cooling member along the X-X' boundary line in the battery module in FIG. 1.
Figure 3:
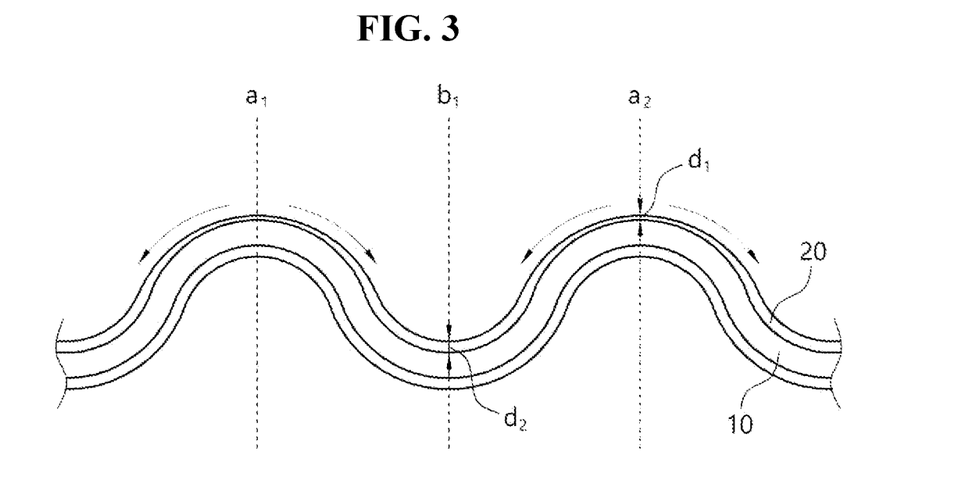
FIG. 3 is a diagram showing the thickness unevenness of an insulating heat dissipation layer coated on a cooling plate on which a pattern is formed.

Referring to FIGS. 1 to 3, the cooling member 100 according to an embodiment of the present invention is a cooling member for a battery module 1000 for efficiently transferring heat emitted from a plurality of battery cells 200 to the outside by being contact (S) with, preferably in surface contact with the plurality of battery cells and closely contacting the contacting interface without air.

The cooling member 100 includes a cooling plate 10 and an insulating heat dissipation layer 20 covering a part or all of the outer surface of the cooling plate 10. FIG. 2 shows that the insulating heat dissipation layer 20 covers the entire surface of the cooling plate 10, but unlike FIG. 2, it may be provided only in a part of the cooling plate 10, and in this case, the insulating heat dissipation layer may be provided at least within a contact area on the main surfaces 100A and 100B of the cooling member 100 in surface contact with the outer surface of the battery cell 200.

The cooling plate 10 serves to transfer heat emitted from the battery cell 200 to other cooling components in the battery module 1000 or to a cooling device or cooling component other than the battery module. The shape of the cooling plate 10 is not limited in the case of an advantageous shape for contacting all of the plurality of battery cells 200 while maximizing the number of battery cells 200 provided in the allowed space of the battery module 1000. As an example, the cooling plate 10 may be a plate-shaped member having main surfaces 100A and 100B, and more specifically, may have a shape in which the cooling plate, which is a plate-shaped member having main surfaces 100A and 100B as shown in FIG. 1, is bent multiple times so that mountains and valleys are repeated in the longitudinal direction, but is not limited thereto.

The length, width and thickness of the cooling plate 10 may be appropriately selected in consideration of the volume of the battery module, the number of allowed battery cells, the size of the battery, the presence or absence of a refrigerant moving channel therein, and the size of the moving channel, and thus the present invention is not particularly limited thereto.

In addition, the cooling plate 10 may be preferably made of a material having high thermal conductivity, and may be, for example, a metal or alloy known to have thermal conductivity, such as aluminum or copper. Alternatively, the cooling plate 10 may be a heat dissipation plastic having a thermal conductive heat dissipation filler in a polymer matrix. In this case, the polymer matrix may be a known thermoplastic resin. In addition, the thermal conductive heat dissipation filler may be a carbon-based heat dissipation filler including one or more selected from the group consisting of carbon nanotube such as single-walled carbon nanotube, double-walled carbon nanotube, and multi-walled carbon nanotube, graphene, graphene oxide, graphite, carbon black, and carbon-metal composite; a metal-based heat dissipation filler including such as aluminum, copper, and iron; and/or a ceramic-based heat dissipation filler including such as alumina, silicon, and boron nitride. Alternatively, the heat dissipation plastic may be formed of an electroconductive polymer compound.

In addition, the cooling plate 10 may have at least one moving passage 1 through which a refrigerant flows therein in order to more effectively dissipate heat generated in the battery cell 200. The refrigerant may be a known refrigerant, for example water or glycol. In addition, since the number and size of the moving passages 1 may be appropriately changed in consideration of the size of the cooling plate 10 and the desired heat conduction efficiency, the present invention is not particularly limited thereto. As an example, the width and thickness of the cooling plate 10 are determined according to the size of the cell, and there should be no problem in assembling the cell module. Two or more moving passages 1 provided therein may be designed to minimize the resistance of the flow of cooling water while maintaining vertical intervals.

Next, as shown in FIGS. 1 to 5, the insulating heat dissipation layers 20 and 20' provided on the cooling plate 10 described above are layers having both insulating characteristics that electrically separate the battery cell 200 and the cooling plate 10, and heat dissipation characteristics capable of rapidly transferring heat emitted from the battery cell 200 to the cooling plate 10 by reducing the thermal resistance of the interface between the battery cell 200 and the cooling plate 10. The insulating heat dissipation layers 20 and 20' may have, for example, a withstand voltage characteristic of 5 kV/mm or more, and more preferably, 10 kV/mm to 15 kV/mm. In addition, the insulating heat dissipation layer may have a thermal conductivity of 0.8 W/m·K or more, more preferably 1.0 W/mK to 5.0 W/m·K.

Figure 4:
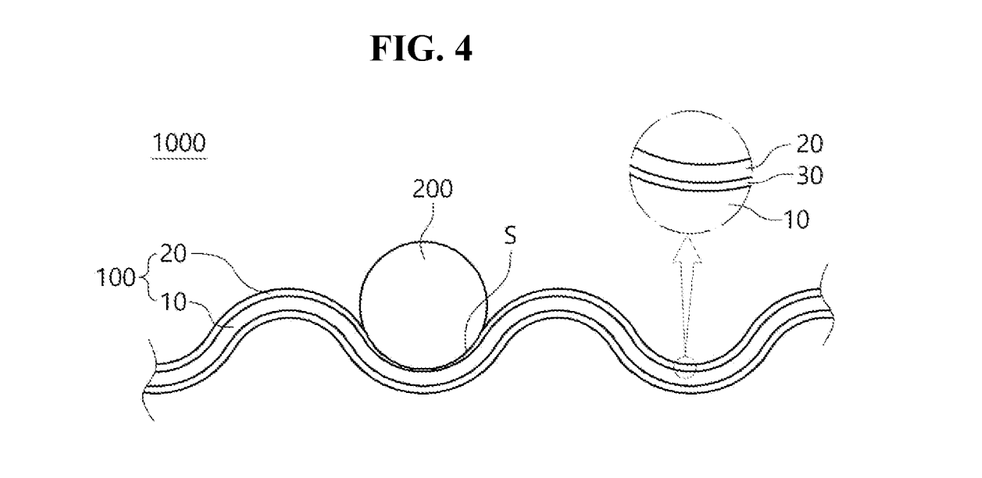
FIG. 4 is a cross-sectional mimetic diagram of a battery module according to an exemplary embodiment of the present invention.
Figure 5:
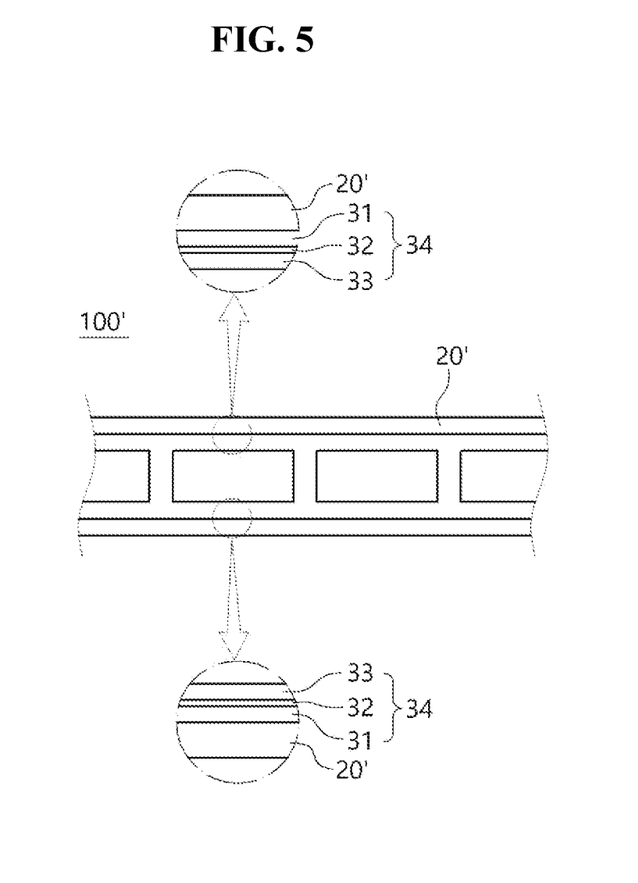
FIGS. 5 and 6 are cross-sectional mimetic diagrams of a cooling member as another example included in an exemplary embodiment of the present invention.

In addition, due to the insulating heat dissipation layers 20 and 20', an air layer may not be substantially included in the interface between the battery cell 200 and the cooling plate 10, and thus more improved heat transfer characteristics may be expressed. In addition, it is advantageous to effectively transfer heat from the battery cell 200 to the cooling plate 10 by increasing the close-contact characteristics and close-contact area between the battery cell 200 and the cooling plate 10. To this end, as shown in FIG. 2, the insulating heat dissipation layer 20 may be a coating layer covering at least a portion of the cooling plate 10, or as shown in FIG. 5, the insulating heat dissipation layer 20' may be a pad layer attached in close contact with the cooling plate through a fixing member 34. The difference between the coating layer and the pad layer is that, in the case of the coating layer, the insulating heat dissipation layer-forming composition is directly processed on the cooling plate 10 to form the insulating heat dissipation layer 20 having a predetermined thickness, and there is an advantage that the insulating heat dissipation layer 20 can be directly attached to the surface of the cooling plate 10 having various shapes without a separate fixing member. In addition, since there is no separate fixing member, heat resistance does not occur due to this, so that heat generated in the battery cell 200 can be more efficiently transferred. In the case of the pad layer, an insulating heat dissipation layer-forming composition is manufactured into a pad or sheet having a predetermined thickness and then applied to the cooling plate 10, and thus a separate fixing member 34 is required. The insulating heat dissipation layers 20 and 20' according to an embodiment of the present invention have predetermined adhesive properties in addition to compressive deformation force, as a physical property for continuously maintaining the contact state with the battery cell even with vibration applied from the outside after contact with the battery cell 200, but it may be difficult to continuously attach the pad layer to the cooling plate 10 only with predetermined adhesive properties, and for this reason, it is attached to the cooling plate 10 through a separate fixing member 34. The pad layer may be larger than the coating layer in terms of thermal resistance, but may have superior bond properties fixed to the cooling plate 10, and is easily manufactured to have a uniform thickness, thus there is an advantage in that a certain heat dissipation characteristic can be expressed regardless of the location. Referring to FIG. 4 for thickness uniformity, the cooling plate 10 according to an embodiment of the present invention is manufactured in a shape to match the shape of the outer surface of the battery cell 200 in order to accommodate a portion of the outer surface of the battery cell 200, and as an example, the mountains ($a_1$, $a_2$) and the valleys ($b_1$) have a continuous wavy cross-section in the longitudinal direction corresponding to the cylindrical battery cell 200, but it is not easy to manufacture a coating layer having a uniform thickness by treating the insulating heat dissipation layer-forming composition on the cooling plate 10 having a wavy cross-section. That is, the insulating heat dissipation layer-forming composition treated on top of the cooling plate 10 may flow in the direction from the mountains ($a_1$,$a_2$) to the valleys ($b_1$) due to its liquid properties and gravity, and for this reason, a thickness ($d_1$) of the insulating heat dissipation layer 20" formed near the mountains ($a_1$,$a_2$) may be thinner than a thickness ($d_2$) of the insulating heat dissipation layer 20" formed near the valleys ($b_1$). Due to this thickness difference, there is a greater risk of short circuit due to a decrease in withstand voltage characteristics in the vicinity of the mountains ($a_1$,$a_2$), and there is a risk that the thermal resistance increases due to the increased thickness in the vicinity of the valleys ($b_1$), thereby lowering the heat transfer efficiency, and as the curvature of the concave portion is reduced, the contact area with the battery is reduced compared to the initial design, so the decrease in the heat transfer efficiency may be further increased. However, when the insulating heat dissipation layers 20 and 20' are manufactured as a pad layer and attached to the cooling plate 10, there is an advantage in that the insulating heat dissipation layer having a uniform thickness can be provided regardless of the shape and position of the cooling plate 10.

The above-described insulating heat dissipation layers 20 and 20' may have a form in which a heat dissipation filler 22 is dispersed in a polymer matrix 21.

The polymer matrix 21 may be a conventional polymer compound itself capable of forming a sheet having a predetermined thickness, or may be formed by crosslinking a polymer compound.

However, as shown in FIG. 4, after the battery cell 200 is accommodated in the pattern of the cooling member 100, even if there is a surface contact between the cooling member 100 and the battery cell 200, and furthermore, there is a spaced tolerance between the pattern and the outer surface of the battery cell 200 due to inability to match between them, it is preferable that the insulating heat dissipation layer 20 has physical properties such as appropriate hardness, compression characteristics, and adhesion that does not cause lifting at the interface with the cooling plate even under an external force, so that the contact area is increased by improving the close-contact characteristics due to the retained compressive deformation force, lifting due to external force such as vibration is minimized due to the expression of predetermined adhesive properties, and the insulating heat dissipation layer 20 is completely maintained despite external force applied in the vertical direction or the left and right directions of the assembled battery cell 200 and the cooling member 100. Accordingly, as an example, the insulating heat dissipation layers 20 and 20' may have a shore hardness of 60 or less, and 35 to 50 as another example. If the shore hardness exceeds 50, there is little compressive deformation of the insulating heat dissipation layer 20, so it is difficult to sufficiently express the close-contact force at the interface between the battery cell 200 and the insulating heat dissipation layer 20, so the improvement in heat dissipation characteristics may be minimal. In addition, if the shore hardness is less than 35, there is a concern that workability is significantly reduced in the process of mounting the battery cell 200 or forming an insulating heat dissipation coating layer, and the like. Meanwhile, shore hardness disclosed in the present invention means Shore OO hardness.

In addition, if the polymer matrix 21 of the insulating heat dissipation layers 20 and 20' is a material capable of expressing the above-described physical properties, there is no limitation. However, in the case of epoxy widely used as a general matrix, it is difficult to satisfy the above-described physical properties due to its high hardness, and it can be easily broken according to the vertical and horizontal movement of the battery cell 200, so it is not preferable as a polymer matrix material of the insulating heat dissipation layers 20 and 20' according to the present invention. Preferably, the polymer matrix 21 may be made of a silicone-based material, an acrylic-based material, or the like, and more preferably a silicone-based material. Specifically, the polymer matrix 21 may be cross-linked by addition polymerization of polydimethylsiloxane containing a vinyl group at the terminal, which may be advantageous in achieving all of the above-described physical properties and realizing a coating layer having a uniform thickness.

In addition, for the heat dissipation filler 22, it is important for the expression of insulation properties to use a heat dissipation filler having a high resistance and/or dielectric constant among general heat dissipation fillers provided in the heat dissipation coating layer. As an example for this, for the heat dissipation filler 22, alumina, yttria, zirconia, aluminum nitride, boron nitride, silicon nitride, silicon carbide, single crystal silicon, etc. may be used.

In addition, the heat dissipation filler 22 may have an average particle diameter of 0.5 to 200 μm. However, according to an embodiment of the present invention, the heat dissipation filler may have an average particle diameter of 50 μm or less, and in another example, 20 to 40 μm. Here, the particle diameter of the heat dissipation filler is the diameter when the shape is spherical, and when the shape is polyhedral or irregular, it means the longest distance among the linear distances between two different points on the surface.

In addition, in order to increase the content in the insulating heat dissipation layers 20 and 20' while minimizing the deterioration of the flexibility and compressive properties of the insulating heat dissipation layers 20 and 20' due to the heat dissipation filler, the heat dissipation filler 22 may be designed as several particle diameter groups having different particle diameters. In addition, the heat dissipation filler may include a first heat dissipation filler having a particle diameter of 1 to 5 μm, a second heat dissipation filler having a particle diameter of 10 to 20 μm, and a third heat dissipation filler having a particle diameter of 25 to 40 μm, in a weight ratio of 1:1.5 to 3:3.5 to 5, and through this, the content in the insulating heat dissipation layer may be increased to 80% by weight or more, and it may be advantageous to achieve the desired effect.

In addition, the heat dissipation filler 22 may be contained 50 to 95% by weight, preferably 60 to 85% by weight, in the insulating heat dissipation layers 20 and 20', thereby improving the heat dissipation characteristics while minimizing the deterioration of the insulation properties.

In addition, the insulating heat dissipation layers 20 and 20' may have a thickness of 300 to 5000 μm, more preferably 300 to 1000 μm, and still more preferably 300 to 500 μm. If the thickness is less than 300 μm, after the battery cell 200 is accommodated in the pattern formed on the cooling members 100 and 100', it may be difficult to express compressive properties for close contact with a large contact area, and there is concern about deterioration of insulation properties. In particular, a difference in the thickness of the insulating heat dissipation layer may be induced in the mountain portion and the valley portion of the pattern formed on the cooling plate 10, and since the thickness of the insulating heat dissipation layer formed in the mountain portion becomes thin, there may be a problem in insulating properties. In addition, if the thickness exceeds 5000 μm, thermal resistance increases, so it may be difficult to smoothly dissipate heat. In addition, it may be difficult to implement the corresponding thickness through coating on the pattern formed on the cooling plate 10, and it may not be easy to attach the pad layer to the pattern even after being implemented as a pad layer. In addition, it may be difficult to adhere without lifting in accordance with the shape of the pattern due to reduced flexibility. Preferably, it may be 1000 μm or less, and when it exceeds this, it may be very difficult to implement an insulating heat dissipation layer through coating. Accordingly, it can more preferably have a thickness of 300 to 500 μm in order that a predetermined thickness can be realized through the coating and the process is easy even when attaching, and in order to adhere to patterns of various shapes and to be fixed on the cooling plate.

More preferably, the insulating heat dissipation layer may have a thickness of 300 to 1000 μm and a shore hardness of 35 to 50, which may be advantageous in realizing an increased heat dissipation characteristic while ensuring an insulation property.

Describing the above-described insulating heat dissipation layer-forming composition for forming the insulating heat dissipation layers 20 and 20', as an example, it may include polydimethylsiloxane containing a vinyl group, which is a silicone-based resin, at the terminal as a binder resin, alumina and a solvent as a heat dissipation filler, and may further contain a catalyst or curing agent necessary for curing. In addition, the viscosity may be 50,000 to 200,000 cPs, through which it is easy to form a coating layer having a thickness of 300 μm or more, and if the viscosity does not satisfy this, it may be difficult to form a coating layer having a thickness of 300 µm or more. In addition, it may be difficult to implement an insulating heat dissipation layer having a uniform thickness if the viscosity is low or high outside this.

Such an insulating heat dissipation layer-forming composition may form a coating layer preferably through impregnation during coating, but in the case of another method, it may be difficult to form an insulating heat dissipation layer having a thickness of 300 µm or more and having a uniform thickness regardless of a location on the cooling plate 10 having a bent pattern. The insulating heat dissipation layer-forming composition treated on the cooling plate 10 may be cured by, for example, heat, and curing conditions may be 10 to 30 minutes at 130 to 160° C. However, curing conditions can be appropriately changed in consideration of the type of binder resin used, and the like.

Meanwhile, as shown in FIG. 4, when the insulating heat dissipation layer 20 is a coating layer, a primer layer 30 may be further included between the cooling plate 10 and the insulating heat dissipation layer 20 in order to improve bond properties with the cooling plate 10. When a pattern is formed on the cooling plate 10, it may not be easy to form a coating layer and maintain bond properties, but the primer layer 30 may help to improve the bond properties of the insulating heat dissipation layer 20 that is a coating layer. The primer layer 30 may have a thickness of 5 to 30 µm, and if it is less than 5 µm, peeling of the insulating heat dissipation layer, which is a coating layer, may occur due to external force such as vibration, and if it is greater than 30 µm, the effect of improving the bond properties is insignificant, and there is a concern that the heat dissipation characteristics may be deteriorated due to an increase in thermal resistance. The primer layer 30 may preferably use a silicone-based primer, thereby further improving the bond properties of the insulating heat dissipation layer using the silicone-based resin as a matrix.

As shown in FIG. 5, when the insulating heat dissipation layer 20' is a pad layer, it further includes a fixing member 34 for fixing to the cooling plate 10, and a member having a known adhesive or bonding material may be used without limitation as the fixing member 34. As an example, it may include an adhesive layer, preferably an adhesive layer having an adhesive strength of 2000 gf/inch or more, and there is no limitation in use in the case of a material capable of expressing the corresponding physical properties. For example, the adhesive layer may be a silicone-based adhesive or an acrylic-based adhesive. In addition, the adhesive layer may have a thickness of 10 to 100 µm, for example, 50 µm.

Meanwhile, the fixing member 34 may have adhesive layers 31 and 33 on both sides of a support layer 32, and the support layer 32 guarantees the mechanical strength of the fixing member consisting only of an adhesive layer or a bonding layer and may be, for example, a PET film. The support layer 32 may have a thickness of 10 to 50 µm, for example, 25 µm. In addition, in the case of the adhesive layers 31 and 33 on both sides, the adhesive layer 31 in contact with the insulating heat dissipation layer 20', which is a silicone pad layer, may be a silicone-based adhesive layer, and the adhesive layer 33 in contact with the cooling plate 10 may be an acrylic-based adhesive layer, and which may be advantageous in expressing more improved fixing properties to the cooling plate 10 on which the pattern is formed. In addition, pressure may be applied to the insulating heat dissipation layer 20', which is a silicon pad layer, due to its close contact with the battery cell, and the silicone-based adhesive has an advantage in that the interface with the insulating heat dissipation layer 20' may not lift even under the pressure applied to the insulating heat dissipation layer 20' and maintain an attached state due to its excellent flexibility, compressive property, and elastic property. If an adhesive layer without flexibility and compressive property is used, even though the adhesive strength is excellent, when pressure is applied to the insulating heat dissipation layer 20', there is a risk that the interface between the insulating heat dissipation layer 20' and the adhesive layer may be lifted or damage such as cracks may occur in the adhesive layer.

When the insulating heat dissipation layer 20' is an insulating tape, the thickness may be, for example, 50 µm to 2.5 mm, or 50 to 1000 µm, but it is not limited thereto.

Figure 6:
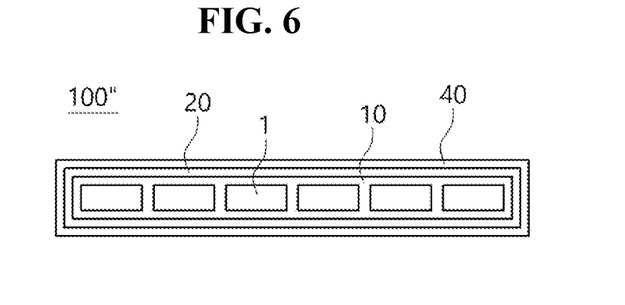

Meanwhile, the cooling members 100 and 100' described above may further include an insulating member to further improve insulating properties. Referring to FIG. 6, a cooling member 100" may be provided with the insulating member 40 in close contact with the insulating heat dissipation layer 20. An air layer may not substantially exist between the insulating member 40 and the insulating heat dissipation layer 20, thereby preventing a decrease in heat transfer efficiency due to the air layer. To this end, the insulating member 40 may be made of a material having heat-shrinkable properties so as to have excellent close-contact force.

Figure 7:
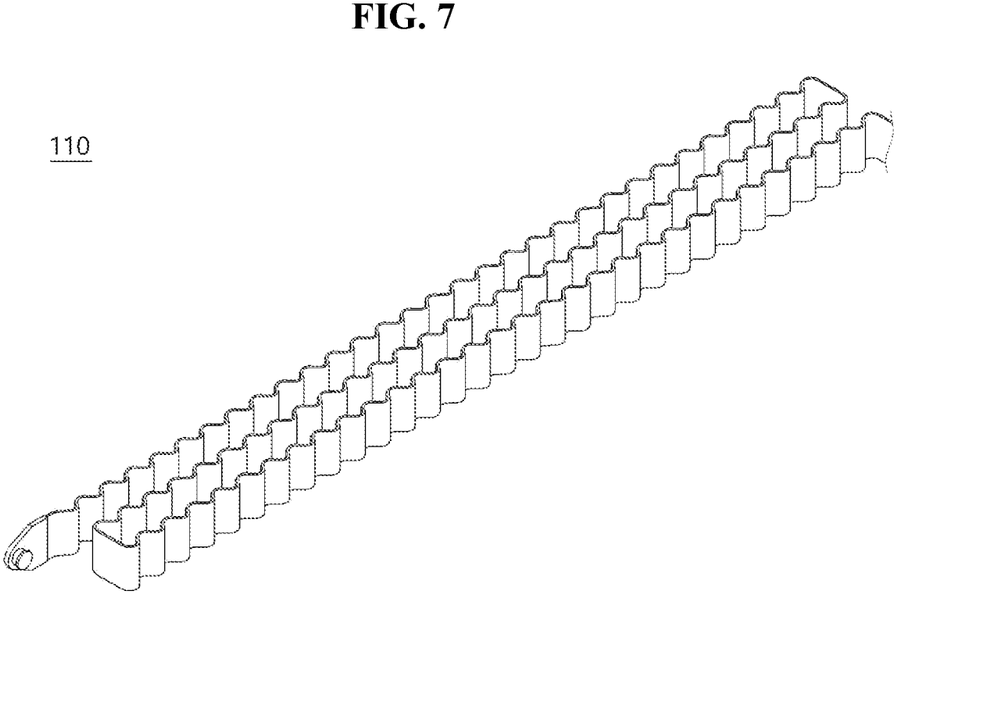
FIG. 7 is a perspective view of a cooling member provided in a battery module according to an exemplary embodiment of the present invention.

In addition, the above-described cooling members 100, 100',100" may be in the form of a plate having a predetermined length along the longitudinal direction, or as shown in FIG. 7, in order to secure and increase the contact area between each battery cell and the cooling member 110 while increasing the number of battery cells in the limited space of the battery module, the cooling member 110 may be bent twice or more along the longitudinal direction, however, the present invention is not limited thereto.

The cooling members 100, 100', 100" having the above-described cooling plate 10 and the insulating heat dissipation layers 20 and 20' have a predetermined pattern formed on the main surfaces 100A and 100B of the cooling members 100, 100', 100" along the longitudinal direction so that at least a portion of the outer surface of the battery cell 200 is accommodated and surface-contacted. The pattern may have a shape matching at least a portion of the outer surface of the battery cell 200, which has an advantage that it can be easily brought into close contact without an air layer between the battery cell 200 and the main surfaces 100A and 1006 of the cooling members 100, 100', 100".

Figure 8:
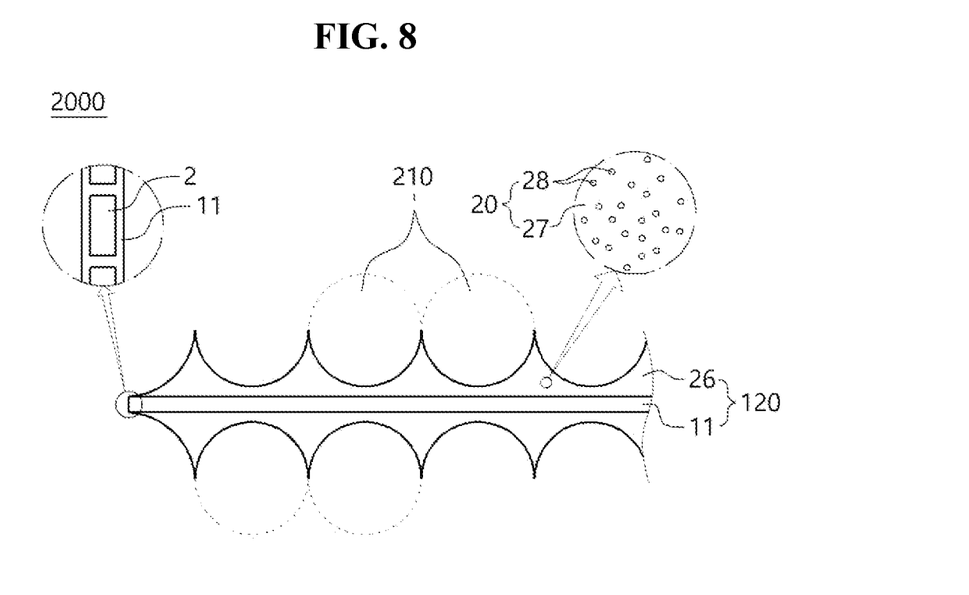
FIGS. 8 and 9 are cross-sectional mimetic diagrams of a cooling member as another example included in a battery module according to an exemplary embodiment of the present invention.
Figure 9:
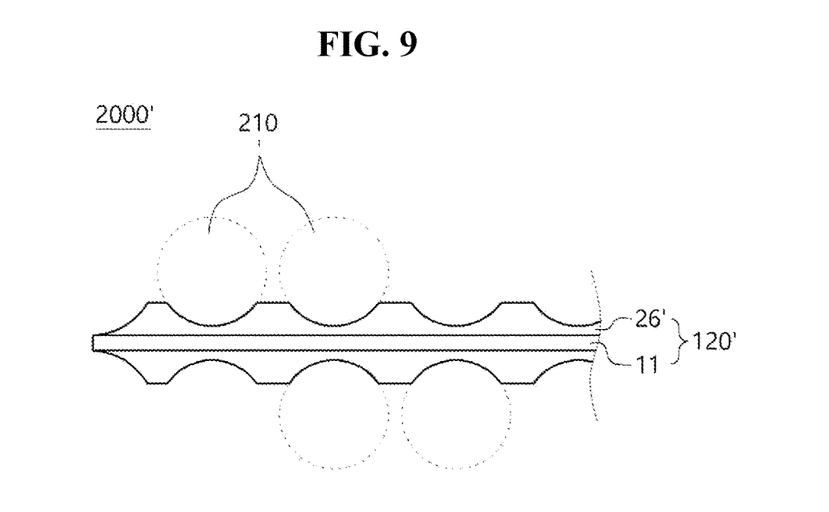

Assuming the battery cell 200 is a cylindrical shape, the pattern may be derived from a cooling plate 10 of wavy cross-section as shown in FIGS. 1 to 3, or may be derived from insulating heat dissipation layers 26 and 26' of corrugated cross-section formed on the non-bent plate-shaped cooling plate 11 as shown in FIGS. 8 and 9. In addition, the corrugated cross-section may be appropriately deformed in consideration of the shape of the outer surface of the battery cells 200 and 210, the area of the main surface of the cooling members 100,100',100",120, 120' in surface contact with the outer surface, the interval between the battery cells 200 and 210 disposed along the longitudinal direction of the cooling members 100, 100', 100", 120, 120', and the like.

Meanwhile, the insulating heat dissipation layers 26 and 26' shown in FIGS. 8 and 9 have a pattern formed so that the upper and lower waveforms are symmetrical with respect to the cooling plate 11, but the present invention is not limited thereto, and it may be formed to be asymmetrical between the waveforms formed on the upper part and the waveforms formed on the lower part, and the size and shape of the waveform may also be different. In addition, it should be noted that the waveforms formed on the upper part may also repeat waveforms of the same shape and size, or may include waveforms of different shapes and sizes.

In addition, the cooling plate 11 may also include at least one moving channel 2 through which a refrigerant may flow therein.

In addition, the insulating heat dissipation layers 26 and 26' may be molded to have a corrugated cross-section, and may be, for example, a molding layer having a heat dissipation filler 28 in a polymer matrix 27. The molding layer is the same as the description of the insulating heat dissipation layer 20, which is the above-described coating layer, and thus a description thereof will be omitted.

The present invention may implement battery modules 1000, 2000 and 2000' by surface-contacting a plurality of battery cells 200 and 210 on the cooling members 100,100', 100",110 and 120 and on a predetermined pattern formed on the main surface of the cooling members 100,100',100",110 and 120. A known secondary battery may be used without limitation as the battery cells 200 and 210, and may be, for example, a lithium ion battery. The battery cells 200 and 210 may have an appropriate size in consideration of the desired electric capacity of the battery module. In addition, the shape of the battery cells 200 and 210 may be cylindrical, but is not limited thereto, and a known battery shape may be employed without limitation. In addition, the number of battery cells 200 and 210 provided in the battery modules 1000, 2000 and 2000' may be appropriately changed in consideration of the electric capacity and volume of the battery modules 1000 and 2000, so the present invention is not limited thereto.

MODE FOR CARRYING OUT THE INVENTION

The present invention will be described in more detail through the following examples, but the following examples are not intended to limit the scope of the present invention, which should be construed to aid understanding of the present invention.

Example 1

Figure 10:
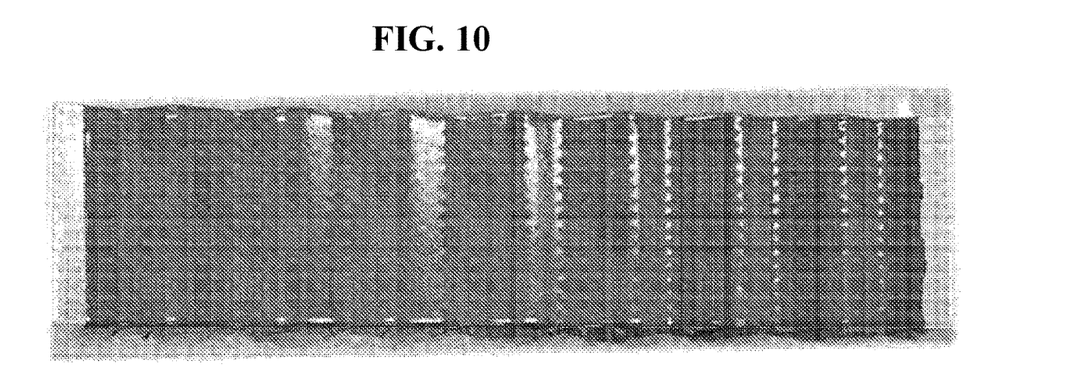
FIG. 10 is a photograph of a cooling member implemented according to Example 1.

A corrugated pattern as shown in FIG. 1 was formed on a flat aluminum member. A silicone-based primer was formed to a thickness of 15 μm on the cooling plate of the implemented aluminum member, and then it was impregnated with an insulating heat dissipation layer-forming composition having a viscosity of 10,000 cps (20% by weight of polydimethylsiloxane containing vinyl groups at both ends, 0.8% by weight of a platinum catalyst, and the remaining amount of alumina having an average particle diameter of 32 μm), and then it was cured by applying heat at 140° C. for 15 minutes to form a cooling member as shown in FIG. 10 in which an insulating heat dissipation layer having a final thickness of 400 μm was formed.

The withstand voltage (breakdown voltage) of the insulating heat dissipation layer of the implemented cooling member was 6.5 kV/mm, the thermal conductivity was 1.5 W/mK, and the Shore OO hardness was 45. In this case, the Shore OO hardness was measured by implementing the same insulating heat dissipation layer-forming composition in the same way so that the final thickness was 400 μm on the release film, and then measuring the Shore OO hardness of the manufactured pad-type insulating heat dissipation layer.

Comparative Example 1

Figure 11:
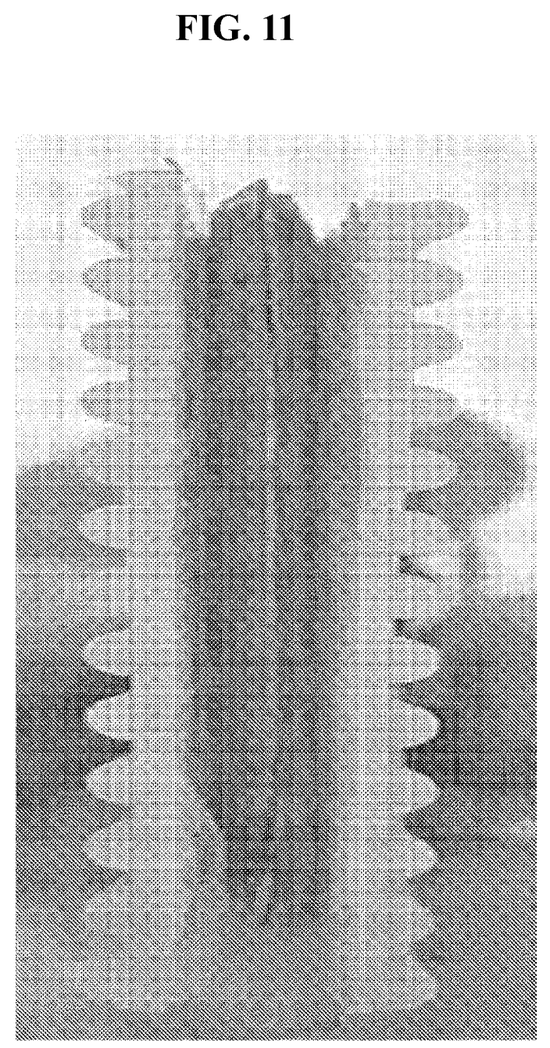
FIG. 11 is a photograph of a cooling member implemented according to Comparative Example 1.

It was prepared in the same manner as in Example 1, but without treating the insulating heat dissipation layer-form-ing composition on the cooling plate, a cooling member as shown in FIG. 11 was formed by surrounding the cooling plate with a PI insulating film having a thickness of 25 μm and then surrounding a rubber pad having a total thickness of 6.5 mm in which the 2.5 mm protrusions were formed.

Experimental Example 1

A PTC element (0.4 A, 3.4 W), which is a heat source, was attached to the same position on one surface of the cooling member according to Example 1 and Comparative Example 1, and then a current was applied to generate heat, and after 1 hour, the temperature of one side (TC1) where the heat source is installed and the other side (TC2) were measured and shown in Table 1 below.

TABLE 1

|  | Example 1 | Comparative Example 1 |
| --- | --- | --- |
| Temperature of TC1 (° C.) | 76 | 120 |
| Temperature of TC2 (° C.) | 69.4 | 59.7 |
| ΔT (° C.) | 6.6 | 60.3 |

As can be seen from Table 1, the cooling member according to Example 1 provided with an insulating heat dissipation layer has a significantly lower temperature than Comparative Example 1 on the heat source side and the opposite side, and it can be seen that the cooling member according to Example 1 has very good heat dissipation characteristics through the small temperature difference between both sides of the cooling plate.

Example 2

A flat cooling plate made of aluminum and having a width of 15 cm was prepared. A pattern in which mountains and valleys are alternately formed in the longitudinal direction as shown in FIG. 1 was formed on the prepared cooling plate to accommodate ⅓ of the circumference in the cross-section of a cylindrical battery having a diameter of 10 cm. Thereafter, the same insulating heat dissipation layer as that used in Example 1 was formed in the same manner to implement the cooling member shown in Table 2 below.

Example 3 to 7

It was manufactured in the same manner as in Example 2, except that the thickness, hardness, and material of the insulating heat dissipation layer were changed as shown in Table 2 below to form a cooling member as shown in Table 2 below. In this case, Examples 5 to 6 increased the degree of curing in order to control the shore hardness, and specifically, the curing time was changed to 25 minutes and 45 minutes, respectively, to implement an insulating heat dissipation layer having a shore hardness of 50 and 60.

In this case, Example 7 uses the same type of heat dissipation filler in the same content as in Example 1, but an insulating heat dissipation layer-forming composition was prepared by mixing 3 parts by weight of a curing agent DICY and 200 parts by weight of methyl ethyl ketone as a solvent to 100 parts by weight of a bisphenol A epoxy component (Kukdo, YG-011) as a matrix forming component, and then was cured at 150° C. for 30 minutes.

Experimental Example 2

In order to simply evaluate the heat dissipation characteristics of the heat generated by the cylindrical battery, a cylindrical aluminum conduit with a diameter of 10 cm and a length of 15 cm corresponding to the cylindrical battery was prepared. In order to heat the aluminum conduit, three PTC elements (0.4 A, 3.4 W), which are heat sources, were attached to the inner wall of the conduit at a distance from each other. After accommodating the prepared cylindrical aluminum conduit in any one of the valleys of one surface of the cooling member according to Examples 2 to 7, a current was applied to the PTC element to generate heat, and then after measuring the temperature of one surface of the cooling member on the side where the aluminum conduit was accommodated and the opposite surface, the temperature difference was calculated, and then the heat dissipation characteristics compared to Example 2 were examined by showing the temperature difference calculated in the other examples as relative percentages in Table 2 based on the temperature difference of Example 2 as 100%. If the heat dissipation characteristic is greater than 100%, it means that the temperature difference between one surface of the heat source side and the opposite surface is larger, and consequently, the heat dissipation characteristic in the thickness direction is worse than that of Example 2.

TABLE 2

| Insulating heat dissipation layer | Example 2 | Example 3 | Example 4 | Example 5 | Example 6 | Example 7 |
|---|---|---|---|---|---|---|
| Matrix material | a crosslinked Polydimethylsiloxane containing vinyl group at the terminal | | | | | Cross-linked bisphenol A type Epoxy |
| Thickness (μm) | 400 | 300 | 200 | 400 | 400 | 400 |
| Shore OO hardness | 45 | 45 | 45 | 50 | 60 | — |
| Heat dissipation characteristic (%) | 100 | 105 | 121 | 103 | 114 | 143 |

As can be seen in Table 2, when the thickness of the insulating heat dissipation layer decreases, the heat dissipation characteristics should be improved due to a decrease in thermal resistance, but in the case of Example 4 having a thickness of less than 300 μm even when the Shore OO hardness was the same as 45, the heat dissipation characteristics were significantly lowered compared to that of Example 3.

These results are expected as a result of a decrease in the amount of compressive deformation of the insulating heat dissipation layer due to the decrease in thickness, and thus the close-contact force or close-contact area between the outer surface of the cylindrical aluminum conduit and the insulating heat dissipation layer is reduced.

In addition, even when the thickness was the same as 400 μm, the heat dissipation characteristics were lowered when the shore hardness was increased to 50 and 60, respectively, and in particular, it can be seen that the heat dissipation characteristic of Example 6 was significantly lowered compared to Example 5.

On the other hand, in the case of Example 7 in which the material was changed to epoxy, the heat dissipation characteristic was significantly lower than that of Example 2.

Although exemplary embodiments of the present invention have been described above, the spirit of the present invention is not limited to the embodiments set forth herein.

Those of ordinary skill in the art who understand the spirit of the present invention may easily propose other embodiments through supplement, change, removal, addition, etc. of elements within the same spirit, but the embodiments will be also within the scope of the present invention.

What is claimed is:

1. A cooling member for a battery module having a cooling plate in contact with a plurality of battery cells to transfer heat emitted from the battery cells to the outside, the cooling member for a battery module, comprising:
   a predetermined pattern formed to accommodate at least a portion of the outer surface of the battery cell on the main surface along the longitudinal direction;
   wherein the predetermined pattern has a cross-section, wherein the cross-section comprises a plurality of a peaks and a plurality of valleys formed alternately;
   an insulating heat dissipation layer having a thickness of 300 to 1,000 μm and a Shore OO hardness of 35 to 50 for covering at least a part of an outer surface of the cooling plate so as to be interposed between the battery cell to be accommodated on the predetermined pattern and the cooling plate, wherein the insulating heat dissipation layer is a coating layer, wherein the coating layer comprises an insulating heat dissipation filler dispersed within a silicone-based matrix, wherein the silicone-based matrix is cross-linked by addition polymerization of polydimethylsiloxane containing a vinyl group at the terminal; and
   a silicone-based primer layer disposed between the coating layer and the cooling plate.

2. The cooling member for a battery module of claim 1, wherein the pattern is formed by a cooling plate or an insulating heat dissipation layer.

3. The cooling member for a battery module of claim 1, wherein the battery cell has a cylindrical shape.

4. The cooling member for a battery module of claim 1, wherein the cooling plate has at least one moving passage through which a refrigerant flows therein.

5. The cooling member for a battery module of claim 1, wherein the insulating heat dissipation layer has a withstand voltage of 5 kV/mm or more.

6. The cooling member for a battery module of claim 1, wherein the cooling member further comprises an insulating member provided in close contact with the insulating heat dissipation layer.

7. A battery module comprising:
   a cooling member for a battery module according to claim 1; and
   a plurality of battery cells in which at least a portion of an outer surface of the pattern of the cooling member is accommodated.

8. An electric vehicle comprising a cooling member for a battery module according to claim 1.

\* \* \* \* \*